United States Patent Office 3,586,681
Patented June 22, 1971

---

3,586,681
1,4,5,6-TETRAHYDROPYRIDAZINES
William J. Houlihan, Mountain Lakes, N.J., assignor to Sandoz-Wander, Inc., Hanover, N.J.
No Drawing. Continuation-in-part of application Ser. No. 566,719, July 21, 1966. This application Nov. 2, 1967, Ser. No. 680,002
Int. Cl. C07d 51/76
U.S. Cl. 260—250      11 Claims

ABSTRACT OF THE DISCLOSURE

The compounds are of the class of 1,3-substituted-1,4,5,6-tetrahydropyridazines and are prepared by reducing corresponding 2,6-substituted-4,5-dihydro-3-(2H)-pyridazinone intermediates. The compounds, as well as certain intermediates, are useful as anti-inflammatory agents.

---

This application is a continuation-in-part of copending application Ser. No. 566,719 filed July 21, 1966, now abandoned.

This invention relates to 1,4,5,6-tetrahydropyridazine derivatives. In particular, this invention pertains to certain 1,3-substituted 1,4,5,6-tetrahydropyridazines and their acid addition salts, intermediates in the preparation thereof and processes for the preparation of such compounds. This invention also relates to pharmaceutical compositions containing the said above compounds and the therapeutic use of such pharmaceutical compositions.

The 1,3-substituted 1,4,5,6-tetrahydropyridazines contemplated by the present invention are of Formula I

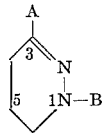

I wherein A is phenyl having from 1 to 2 substituents, pyridyl, thienyl or furyl, each of said phenyl substituents being, independently halogen having an atomic weight of from 19 to 36, trifluoromethyl, lower alkyl or lower alkoxy, and B is lower alkyl, HO-lower alkylene-or pyridyl.

With respect to the above-mentioned phenyl substituents, preferred lower alkyl substituents are straight chain alkyl and having from 1 to 4 carbon atoms, e.g., methyl, ethyl, n-propyl and n-butyl; preferred alkoxy substituents are straight chain alkoxy having from 1 to 4 carbon atoms, e.g., methoxy, ethoxy, n-propoxy and n-butoxy, and the halogen substituents include fluorine and chlorine.

Representative substituted phenyl functions suitable as —A include p-methoxyphenyl, p-chlorophenyl, 3,4-dichlorophenyl, p-fluorophenyl and p-tolyl.

Pyridyl, thienyl and furyl functions suitable as —A include 2-, 3- and 4-pyridyl, 2- and 3-thienyl and 2- and 3-furyl.

With respect to —B, preferred lower alkyl functions have from 1 to 4 carbon atoms, such as methyl, ethyl, propyl, isopropyl, n-butyl, isobutyl and t-butyl; and preferred HO-alkylene functions are ω-hydroxy (lower straight chain)alkyl having from 2 to 4 carbon atoms, such as 2-hydroxy-ethyl, 3-hydroxypropyl and 4-hydroxybutyl.

Compounds of Formula I are obtained by reduction of the corresponding carbonyl-containing intermediates, i.e. 2,6-substituted 4,5-dihydro-3(2H)-pyridazinones of Formula II

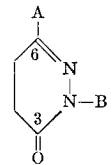

(II)

in which A and B are as defined above. The carbonyl-containing intermediates (compounds of Formula II) are also included within the scope of the present invention.

The reduction of a compound of Formula II to its corresponding compound of Formula I may be effected by conventional means for reducing a carbonyl to a methylene (step A), e.g., by the use of lithium aluminum hydride (LAH) in an inert solvent, such as tetrahydrofuran (THF), diethyl ether or dibutyl ether at temperatures of from about 20° to 150° C., preferably at reflux temperatures, and in a nitrogen atmosphere. It is also preferred to use the reducing agent in a ratio of from 1.0 to 1.8 equivalents per equivalent of the compound of Formula II.

The compounds of Formula II may be prepared by condensation (Step B) of a suitable γ-ketobutyric acid, i.e. a compound of Formula III

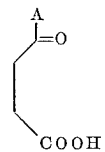

(III)

in which A is as defined above, with a hydrazine of Formula IV

(IV)

in which B is as defined above.

The condensation (step B) may be carried out in a conventional manner. For example, the condensation may be carried out by heating an intimate mixture of a compound of Formula III and a compound of Formula IV, preferably in an inert solvent, e.g., toluene, preferably in the presence of an acid-acting catalyst, such as an arylsulfonic acid, e.g., para-toluene sulfonic acid monohydrate, and at temperatures of from about 60° to 150°, preferably at reflux temperatures. It is preferred to remove water formed in the reaction, for example, by selecting a solvent which forms an azeotrope with water but is water immiscible, thus permitting use of a Dean-Stark tube to remove water from the reaction system. While compounds of Formula III, theoretically, react with compounds of Formula IV in a molar ratio of 1:1 to form the corresponding compound of Formula II, it is preferred to carry out this condensation reaction using an excess of the compound of Formula IV, e.g., using from 10 to 100 mole percent excess of the compound of Formula IV.

The compounds of Formulae III and IV are either known and can be prepared as described in the literature or can be prepared from known starting materials in analogous manner to that described in the literature for the preparation of known compounds.

The relationship of the above-mentioned reactions may be conveniently illstrated as follows:

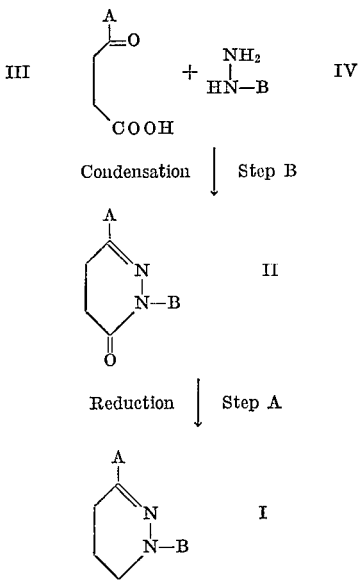

The compounds of Formula I are useful because they posses pharmacological activity in animals. In particular, the compounds of Formula I, as well as those compounds of Formula II wherein B is other than HO-lower alkylene-, are useful as anti-inflammatory agents, as indicated by the carrageenan-induced edema test on the white rat paw. For such use the compounds may be admixed with conventional pharmaceutical carriers or diluents and administered internally (orally or parenterally) in the form of tablets, capsules, elixirs, solutions or suspensions. Furthermore, those compounds which are bases, i.e. all the compounds of Formula I and those compounds of Formula II where any of A and B is a pyridyl moiety, may also be administered in the form of their non-toxic pharmaceutically acceptable acid addition salts.

Such salts posses the same order of activity of the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

For the above-mentioned use, the dosage administered will, of course, vary depending upon the compound employed, mode of administration and treatment desired. However, in general, satisfactory results are obtained when administered at a daily dosage of from about 10 milligrams per kilogram of body weight to about 100 milligrams per kilogram of body weight preferably given in divided doses 2 to 6 times a day or in sustained release form. For the larger mammals as well as the smalled domestic mammals, total daily dosage is generally from about 200 milligrams to about 3000 milligrams, and dosage forms suitable for internal administration comprise from about 35 milligrams to about 500 milligrams of the compound admixed with a solid or liquid pharmaceutical carrier or diluent.

Pharmaceutical compositions containing said compounds may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g., strach and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract, if desired. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydrobenzoate). Capsules may contain the active ingredient alone or admixed with an inert solid diluent, e.g., calcium carbonate, calcium phosphate and kaolin.

The preferred pharmaceutical compositions from the standpoint of preparation and ease of administration are solid compositions, particularly hard-filled capsules and tablets containing from about 100 millgrams to about 500 milligrams of the active ingredient.

The following examples serve to further illustrate the present invention. However, it is to be understood that the examples are for purposes of illustration only and are not intended as in any way limiting the scope of the invention which is defined in the appended claims. Furthermore, it is to be understood that the active ingredient used in Examples 14 and 15 can be replaced by any of the other compounds described hereinabove and there are likewise obtained pharmacuetical compositions suitable for the treatment of inflammations.

EXAMPLE 1

6-(p-chlorophenyl)-2-methyl-4,5-dihydro-3(2H)-pyridazinone

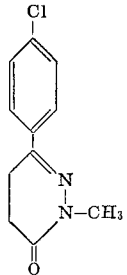

To a flask equipped with a heater, a stirrer and a reflux condenser fitted with a Dean-Stark tube is charged 21.3 g. (0.10 mole) of 3-(p-chlorobenzoyl)propionic acid, 6.9 g. (0.15 mole) of methylhydrazine, 0.1 g. of p-toluene sulfonic acid monohydrate and 300 ml. of toluene. The mixture in the flask is stirred, heated to maintain refluxing and water is continuously removed from the system. After formation of water of reaction ceases the reaction mixture is allowed to cool, removed from the flask and the toluene substantially removed under vacuum in a rotary evaporator to obtain a residue. The residue is crystallized from methanol-water (2:1) to obtain 6-(p-chlorophenyl)-2 - methyl-4,5-dihydro-3(2H)-pyridazinone, M.P. 76° to 78° C.

EXAMPLE 2

3-(p-chlorophenyl)-1-methyl-1,4,5,6-tetrahydropyridazine

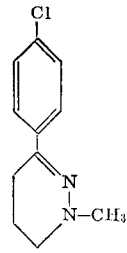

To a flask equipped with a heater, a stirrer, a reflux condenser and an addition funnel is charged 2.38 g. (0.063 mole) of lithium aluminum hydride and 300 ml. anhydrous diethyl ether. The system is blanketed with dry nitrogen gas and a solution of 11.13 g. (0.05 mole) of 6-(p-chlorophenyl)-2-methyl-4,5-dihydro-3(2H)-pyridazinone (obtained as described in Example 1) in 300 ml. of anhydrous diethyl ether is added dropwise, with stirring, over a period of 0.5 hour. The resulting mixture is refluxed for 15 hours, then cooled in an ice bath. To the cooled mixture is added first dropwise 4.8 ml. of 2 N sodium hydroxide with 6.9 ml. of water and then 15 g. of anhydrous sodium sulfate. The solids are removed from the mixture by filtration, and the filtrate is then evaporated under vacuum in a rotary-evaporator to obtain a residue. The residue is then dissolved in 50 ml. of chloroform. The chloroform solution is then chromatographed through a silica gel column to obtain, by eluting with chloroform, 3-(p-chlorophenyl)-1-methyl-1,4,5,6 - tetrahydropyridazine, which is then crystallized from pentane, M.P. 52° to 54° C.

EXAMPLE 3

6-(p-methoxyphenyl)-2-methyl-4,5-dihydro-3(2H-pyridazinone

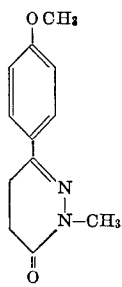

Reacting 68.5 g. (0.33 mole) of 3-(p-anisoyl)-propionic acid with 20.7 g. (0.45 mole) of methylhydrazine in 500 ml. of toluene in the presence of 0.5 g. of p-toluene sulfonic acid monohydrate, as described in Example 1, 6-(p-methoxyphenyl)-2-methyl-4,5-dihydro - 3(2H) - pyridazinone is obtained; M.P. 129° to 130°, crystallized from methylene chloride-pentane (1:1).

EXAMPLE 4

3-(p-methoxyphenyl)-1-methyl-1,4,5,6-tetrahydropyridazine

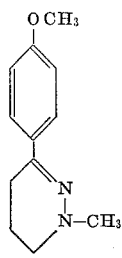

Reacting 62 g. (0.284 moles) of 6-(p-methoxyphenyl)-3-methyl-4,5-dihydro-3(2H)-pyridazinone obtained as described in Example 3, in 800 ml. of anhydrous diethyl ether with 21.6 g. (0.57 mole) of lithium aluminum chloride in 2000 ml. of anhydrous diethyl ether, as described in Example 2, 3-(p-methoxyphenyl) - 1 - methyl-1,4,5,6-tetrahydropyridazine; is obtained, M.P. 77° to 79° C., crystallized from methanol-water (1:1).

EXAMPLE 5

6-(p-chlorophenyl)-2-(α-pyridyl)-4,5-dihydro-3(2H)-pyridazinone

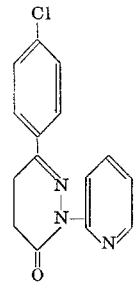

Reacting 63.7 g. (0.30 mole) of 3-(p-chlorobenzoyl)-propionic acid with 49.0 g. (0.45 mole) of 2-hydrazinopyridine in 600 ml. of toluene in the presence of 1 g. of p-toluene sulfonic acid monohydrate, as described in Example 1, 6 - (p-chlorophenyl)-2-(α-pyridyl)-4,5-dihydro-3 2H)-pyridazinone is obtained, M.P. 118° to 119° C., crystallized from methanol-water (1:1).

EXAMPLE 6

3-(p-chlorophenyl)-1-(α-pyridyl)-1,4,5,6-tetrahydropyridazine

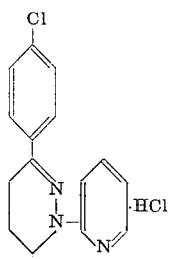

Reacting 14.3 g. (0.05 mole) of 6-(p-chlorophenyl)-2-(α-pyridyl)-4,5-dihydro-3(2H)-pyridazinone in 125 ml. of anhydrous tetrahydrofuran and 500 ml. of anhydrous diethyl with 2.38 g. (0.063 mole) of lithium aluminum hydride in 200 ml. of anhydrous diethyl ether, as described in Example 2, to obtain an oily residue containing 3-(p-chlorophenyl) - 1 - (α - pyridyl) - 1,4,5,6 - tetrahydropyridazine. The oily residue is dissolved in 200 ml. of anhydrous diethyl ether, and the solution is then saturated with anhydrous hydrogen chloride, at 20° C., to precipitate 3-(p-chlorophenyl)-1-(α-pyridyl)-1,4,5,6-tetrahydropyridazine as then monohydrochloride salt. The salt recrystallizes from isopropanol-tetrahydrofuran-ethyl acetate (2:1:1), melts with decomposition at above 85° C.

EXAMPLE 7

3-methyl-6-(2-thienyl)-4,5-dihydro-3(2H)-pyridazinone

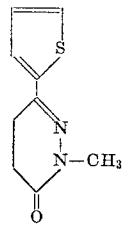

Reacting 36.8 g. (0.20 mole) of 3-(2-thienyl)-propionic acid with 13.8 g. (0.30 mole) of methylhydrazine in 300 ml. toluene in the presence of 0.5 g. of p-toluene sulfonic acid monohydrate, as described in Example 1, 3-methyl-6-(2-thienyl)-4,5-dihydro-3(2H)-pyridazinone is obtained, M.P. 104° to 105° C. crystallized from chloroform-pentane (2:1).

EXAMPLE 8

1-methyl-3-(2-thienyl)-1,4,5,6-tetrahydropyridazine

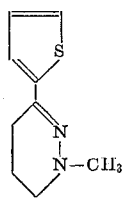

Reacting 14.55 g. (0.075 mole) of 2-methyl-6-(2-thienyl)-4,5-dihydro-3(2H)-pyridazinone in 500 ml. of anhydrous diethyl ether and 150 ml. of anhydrous tetrahydrofuran with 3.56 g. (0.094 mole) of lithium aluminum hydride in 300 ml. of anhydrous diethyl ether, as described in Example 2 to obtain an oily residue containing 1-methyl-3-(2-thienyl)-1,4,5,6 - tetrahydropyridazine. The oily residue is distilled at 120° C. and 0.5 mm. Hg in a Kugelrohr tube to obtain 1-methyl-3-(2-thienyl)-1,4,5,6-tetrahydropyridazine.

EXAMPLE 9

6-(3,4-dichlorophenyl)-2-methyl-4,5-dihydro-3(2H)-pyridazinone

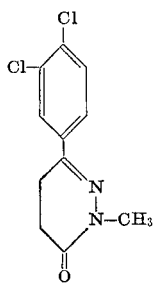

Reacting 24.7 g. (0.10 mole) of 3-(3,4-dichlorobenzoyl)-propionic acid with 6.9 g. (0.1 mole) of methylhydrazine in 300 ml. of toluene in the presence of 0.1 g. of p-toluene sulfonic acid monohydrate, as described in Example 1, 6-(3,4-dichlorophenyl)-2-methyl-4,5-dihydro-3(2H)-pyridazinone, is obtained, M.P. 127° to 129° C., crystallized from methanol-water (2:1).

EXAMPLE 10

3-(3,4-dichlorophenyl)-1-methyl-1,4,5,6-tetrahydropyridazine

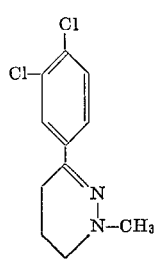

Reacting 12.85 g. (0.05 mole) of 6-(3,4-dichlorophenyl) - 2 - methyl-4,5-dihydro-3(2H)-pyridazinone, obtained as described in Example 15, in 600 ml. of anhydrous diethyl ether with 2.38 g. (0.063 mole) of lithium aluminum hydride in 300 ml. of anhydrous diethyl ether, as described in Example 2, 3-(3,4-dichlorophenyl)-1-methyl-1,4,5,6-tetrahydropyridazine is obtained, M.P. 43° to 45° C., chromatographed through silica gel with chloroform and crystallized from pentane.

EXAMPLE 11

6-(p-chlorophenyl)-2-(3-hydroxypropyl)-4,5-dihydro-3(2H)-pyridazinone

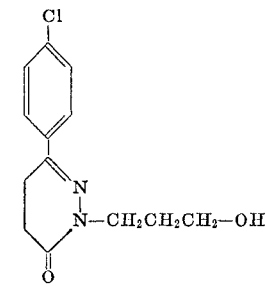

To a flask equipped with a condenser, Dean-Stark tube and stirrer is added 63.9 g. (0.30 mole) of 3-p-chlorobenzoylpropionic acid, 31.5 g. (0.35 mole) of 3-hydrazinopropanol and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from chloroform-pentane to obtain 6-(p-chlorophenyl)-2-(3-hydroxypropyl)-4,5-dihydro-3(2H)-pyridazinone, M.P. 128° to 132° C.

In an analogous manner to that described in Example 11, 6 - (p-chlorophenyl) - 2-(2-hydroxyethyl)-4,5-dihydro-3(2H)-pyridazinone, M.P. 120.5° to 122.5° C., from methanol/water (1:1); 6-(p-chlorophenyl)-2-(4-hydroxybutyl)-4,5-dihydro-3(2H)-pyridazinone, M.P. 102° to 104° C., from methanol/water (1:1) are obtained by replacing the 3-hydrazinopropanol with an equivalent amount of 2-hydrazinoethanol and 4-hydrazinobutanol, respectively.

EXAMPLE 12

3-(p-chlorophenyl)-1-(3-hydroxypropyl)-1,4,5,6-tetrahydropyridazine

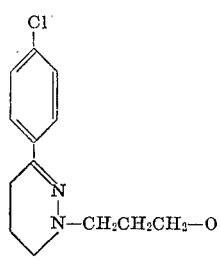

To a flask equipped with a stirrer, condenser, gas inlet tube and Soxhlet tube containing 53.4 g. (0.20 mole) of 2-(3-hydroxypropyl)-6-(p-chlorophenyl) - 4,5-dihydro-3(2H)-pyridazinone is added under nitrogen atmosphere 14.3 g. (0.376 mole) of lithium aluminum hydride and 1500 ml. of absolute diethyl ether. The contents of the flask are stirred and refluxed for 18 hours and then cooled in an ice bath. To the cooled mixture is then added dropwise 28.6 ml. of 2 N sodium hydroxide and 42.9 ml. of water. The resulting mixture is then filtered, and the filtrate concentrated on a rotary evaporater to obtain a viscous oil. The oil is then dissolved in chloroform and chromatographed on silica gel, and eluted with chloroform:methanol (98:2) to obtain 3-(p-chlorophenyl)-1-(3-hydroxypropyl)-1,4,5,6 - tetrahydropyridazine a solid, which is then crystallized from pentane, M.P. 64° to 66° C.

EXAMPLE 13

2-(3-hydroxypropyl)-6-(p-methoxyphenyl)-4,5-dihydro-3(2H)-pyridazinone

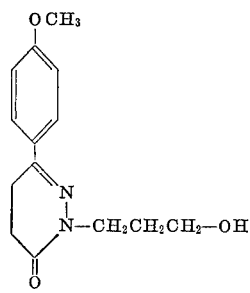

To a flask equipped with a condenser, Dean-Stark tube and stirrer is added 20.8 g. (0.01 mole) of 3-p-methoxybenzoylpropionic acid, 13.5 g. (0.15 mole) of 3-hydrazinopropanol and 250 ml. of toluene. The mixture is stirred and refluxed until water ceases to separate in the Dean-Stark tube. The solvent is then removed in vacuo on a rotary evaporator to yield an oil which solidified on standing. The resulting solid material is crystallized from chloroform-pentane (1:5) to obtain 2-(3-hydroxypropyl)-6-(p-methoxyphenyl) - 4,5 - dihydro-3(2H)-pyridazinone, M.P. 117° to 118° C.

In an analogous manner to that described in Example 13, there is obtained from 3-(2-thienyl)-propionic acid and 3 - hydrazinopropanol 2-(3-hydroxypropyl)-6(2-thienyl)-4,5 - dihydro-(3(2H)-pyridazinone, M.P. 78° to 80° C. from ethyl acetate, and there is obtained from 3-(3,4-benzoyl)propionic acid and 4-hydrazinobutanol 6-(3,4 - dichlorophenyl) - 2 - (4-hydroxybutyl)-4,5-dihydroxy-3(2H)-pyridazinone, M.P. 111° to 113° C., from methanol/water (1:1).

EXAMPLE 14

Tablets

Tablets suitable for oral administration and containing the following ingredients are prepared by conventional tabletting techniques.

| Ingredient: | Weight (mg.) |
|---|---|
| 1-methyl-3-(2-thienyl)-1,4,5,6-tetrahydropyridazine | 250 |
| Tragacanth | 10 |
| Lactose | 197.5 |
| Corn starch | 25 |
| Talcum | 15 |
| Magnesium stearate | 2.5 |

The tablets so prepared are useful in the treatment of inflammations at a dose of one tablet, 2 to 6 times a day, i.e., 500 to 1500 mg. per diem.

EXAMPLE 15

Dry filled capsules

Capsules suitable for oral administration containing the following ingredients are prepared in conventional manner.

| Ingredient: | Weight (mg.) |
|---|---|
| 1-methyl-3-(2-thienyl)-1,4,5,6-tetrahydropyridazine | 500 |
| Inert solid diluent (starch, lactose or kaolin) | 500 |

The capsules so prepared are useful in the treatment of inflammations at a dose of one capsule, 1 to 3 times a day, i.e., 500 to 1500 mg. per diem.

What is claimed is:

1. A product which is a member selected from the group consisting of (1) a compound of the formula

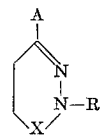

wherein

A is phenyl having from 1 to 2 substituents, pyridyl, thienyl or furyl, each of substituents being, independently, halogen having an atomic weight of from 19 to 36, trifluoromethyl, lower alkyl or lower alkoxy;

R is lower alkyl; and

X is —$CH_2$— or >C=O; and (2) a pharmaceutically acceptable acid addition salt of said compound when X is —$CH_2$— or A is pyridyl.

2. A product of claim 1 wherein X is —$CH_2$—.

3. The compound of claim 2 which is 3-(p-chlorophenyl)-1-methyl-1,4,5,6-tetrahydropyridazine.

4. The compound of claim 2 which is 3-(p-methoxyphenyl)-1-methyl-1,4,5,6-tetrahydropyridazine.

5. The compound of claim 2 which is 3-(3,4-dichlorophenyl)-1-methyl-1,4,5,6-tetrahydropyridazine.

6. The compound of claim 2 which is 1-methyl-3-(2-thienyl)-1,4,5,6-tetrahydropyridazine.

7. A product of claim 1 wherein X is >C=O.

8. The compound of claim 7 which is 6-(p-chlorophenyl)-2-methyl-4,5-dihydro-3(2H)-pyridazinone.

9. The compound of claim 7 which is 6-(p-methoxyphenyl)-2-methyl-4,5-dihydro-3(2H)-pyridazinone.

10. The compound of claim 7 which is 6-(3,4-dichlorophenyl)-2-methyl-4,5-dihydro-3(2H)-pyridazinone.

11. The compound of claim 7 which is 3-methyl-6-(2-thienyl)-4,5-dihydro-3(2H)-pyridazinone.

References Cited

UNITED STATES PATENTS 3,379,726  4/1968  Montzka _____ 260—250A

NICHOLAS S. RIZZO, Primary Examiner

U.S. Cl. X.R.

424—250